United States Patent [19]
Meissner

[11] 3,954,938
[45] May 4, 1976

[54] REMOVAL OF HYDROGEN SULFIDE FROM REDUCING GASES

[75] Inventor: Herman P. Meissner, Winchester, Mass.

[73] Assignee: Institute of Gas Technology, Chicago, Ill.

[22] Filed: Oct. 25, 1974

[21] Appl. No.: 517,949

Related U.S. Application Data

[63] Continuation-in-part of Ser. No. 334,396, Feb. 21, 1973, abandoned.

[52] U.S. Cl. .......................... 423/210.5; 423/567 R; 423/573 G
[51] Int. Cl.² ........................................ C01B 17/04
[58] Field of Search ................ 423/210.5, 230, 573, 423/567; 208/249; 204/66

[56] References Cited
UNITED STATES PATENTS

| | | | |
|---|---|---|---|
| 501,988 | 7/1893 | Carman | 208/249 |
| 815,881 | 3/1966 | Townsend | 204/66 |
| 3,079,223 | 2/1963 | Lewis | 423/230 |
| 3,479,261 | 11/1969 | Heredy | 204/41 |

FOREIGN PATENTS OR APPLICATIONS 298,726   10/1928   United Kingdom

OTHER PUBLICATIONS

APC. 393,258; published July 13, 1943.

*Primary Examiner*—G. O. Peters
*Attorney, Agent, or Firm*—Dominik, Knechtel, Godula & Demeur

[57] ABSTRACT

Hot reducing gases are cleaned of sulfur compounds without requiring cooling. A melt of molten lead and metal sulfide is contacted with the hot reducing gases to remove sulfur compounds such as hydrogen sulfide. The lead and elemental sulfur are regenerated from the formed lead sulfide so that the lead can be recycled in excess amounts for subsequent reaction with substantially all the sulfur compound in the hot reducing gases, while reducing the amount of formed metal sulfide slurry in the molten metal to obtain a pumpable mixture.

3 Claims, 2 Drawing Figures

U.S. Patent May 4, 1976 3,954,938
*FIG. 1*
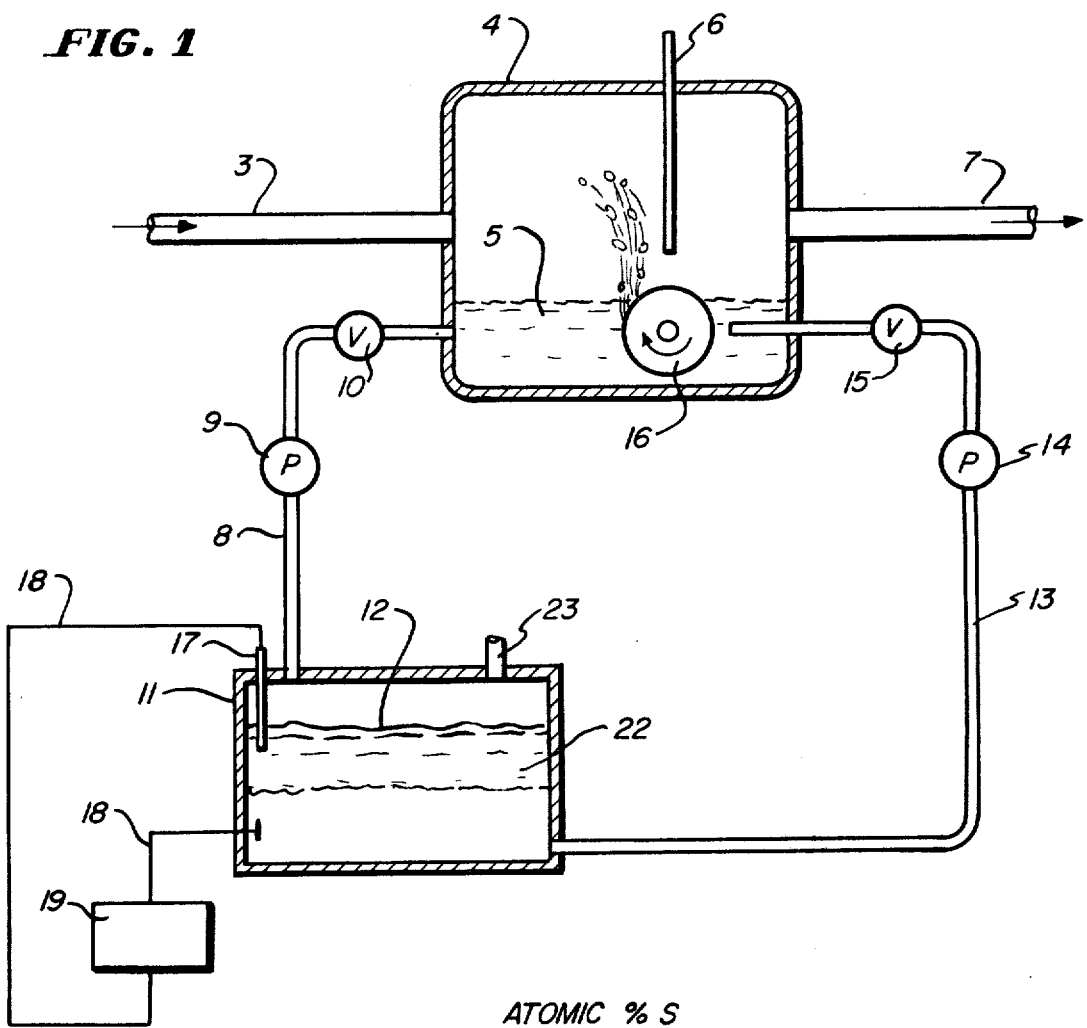
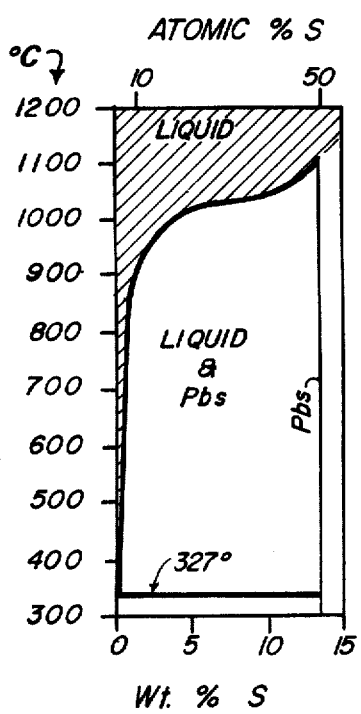
*FIG. 2*

REMOVAL OF HYDROGEN SULFIDE FROM REDUCING GASES

This application is a continuation-in-part of Ser. No. 334,396, filed Feb. 21, 1973, now abandoned by the same applicant, in the name of the same assignee of record.

This invention relates to a method for removing sulfur compounds from hot reducing gases, and the invention also relates to apparatus for practicing such method. In particular, the invention relates to removing sulfur compounds from such hot gases by utilizing molten heavy metals to react with sulfur compounds to form non-volatile sulfides, decomposing these sulfides in a separate vessel, recycling the regenerated reagent metal in excess amount for subsequent reactions, and recovering the elemental sulfur.

Various industrial processes generate large quantities of high temperature gases which are characterized as "reducing gases". Such reducing gases generally contain hydrogen, water vapor, carbon monoxide and carbon dioxide. Hydrocarbons and nitrogen may or may not be present, but molecular oxygen is never present to any significant degree. Whether or not a given gas is reducing with reference to a given reaction depends on the temperature and upon the ratios of hydrocarbon to water and of carbon monoxide to carbon dioxide, such ratios expressed as volume percent by:

$(H_2)/(H_2O)$ and $(CO)/(CO_2)$

This is illustrated by the following reactions:

1. $PbO + CO = Pb + CO_2$
2. $PbO + H_2 + Pb + H_2O$

A reducing gas will cause reaction (1) to proceed to the right at 425°C when the ratio of $H_2O/H_2$ is less than about $2.5 \times 10^4$, and less than about $2.8 + 10^3$ at 920°C. Similarly, reaction (1) will proceed to the right when the ratio of $CO_2/CO$ is less than $2.5 + 10^5$ at 426°C, and less than $2.5 + 10^3$ at 920°C. In other words, lead oxide does not form even in very mildly reducing gases, namely those which contain only small amounts of CO and $H_2$ relative to $CO_2$ and $H_2O$.

A gas which is reducing toward a given oxide, such as lead oxide is often not reducing toward another oxide. Thus at 920°C, the $CO_2/CO$ ratio required to reduce lead oxide is less than $2.5 \times 10^3$, a stated above, but for iron oxide reductions, the ratio must be less than about 0.45. It is, of course, recognized that the ratios $H_2O/H_2$ and $CO_2/CO$ are related through the so-called water gas shift reactions:

$H_2O + CO = H_2 + CO_2$

That is, when the gas is at equilibrium, then the ratios $H_2O/H_2$ and $CO_2/CO$ in a given gas are so related that they are either both reducing for a given oxide, or both not reducing for a given oxide.

Reducing gases are commonly contaminated with hydrogen sulfide and other gaseous sulfur compounds such as carbonyl sulfide. One example is the fuel gas generated by reacting coal or coke with steam or with a mixture of oxygen and steam at elevated temperatures, thereby forming a complex gas mixture containing hydrogen, carbon monoxide, methane, water vapor, and other gases, together with hydrogen sulfide and smaller amounts of other sulfur compounds. The undesirable sulfur compounds here are of course derived from the sulfur present in the coal. Other hot reducing fuel gas streams are those formed after reacting petroleum hydrocarbons at elevated temperatures with steam or a mixture of steam and oxygen or air. Among the components present in such a stream are hydrogen, carbon monoxide, carbon dioxide, various gaseous hydrocarbons, and undesirable sulfur compounds formed from the sulfur in the petroleum. Many gas streams in petroleum refineries, comprising largely hydrocarbons, also carry undersired sulfur compounds derived from sulfur in the crude oil being processed.

It is generally highly desirable, and often essential to remove the sulfur compounds mentioned above from these gases. The common approach is first to cool the gas to a relatively low temperature, and then to scrub the gas stream with an aqueous solution containing a water soluble reagent such as a carbonate. If reducing gases are required for use at an elevated temperature, then said cooled and scrubbed gases must be reheated. Such cooling and reheating of these gases in order to remove sulfur is understandably undesirable because of the equipment and processing complexities and costs involved. Moreover, the loss of heat energy in such cooling and reheating is not acceptable in many industrial processes. It is understood, therefore, that a need exists for a method of extensively removing sulfur compounds from gases without the necessity of preliminary cooling in the purification procedure.

A recent method has been described in U.S. Pat. No. 3,690,808 for removing sulfur compounds by reacting combustion gases in a combustion chamber with molten copper, and then processing the copper sulfife to refine the copper and produce sulfur dioxide. It is desirable to utilize aspects of such a teaching in an alternative and improved system.

An object of the present invention is to provide a method and apparatus whereby undesirable sulfur may be removed from hot reducind gases by a melt containing molten reagent metal and some metal sulfide, without removing other desirable gas components in the hot reducing gas stream; then regeneratng the formed metal sulfide to collect such sulfur and regenerated reagent metal; and then returning excess amounts of the reagent metal to the reaction zone.

Still yet another important object of the present invention is to provide a method and apparatus for removing undesirable sulfur compounds, such as hydrogen sulfide, carbonyl sulfide, mercaptans and the like, from hot reducing gas streams in the form of metal sulfide, such as lead sulfide; regenerating the lead sulfide to obtain elemental sulfur and molten lead in a regeneration chamber, and then recycling the lead in excess amounts sufficient for subsequent reaction with all the sensed sulfur compound in the hot reducing gas streams. A feature of this object provides condition for placing the metal sulfide in solution or rendering solid metal sulfide to a pumpable slurry by the excess amounts of metal recycled. The melt is then easily transferred to a regeneration zone.

In accordance with the teachings of the invention, there is now disclosed a method for substantially removing contaminating sulfur compounds from hot reducing gases without the necessity of extensive precooling and subsequent reheating. The heat content of the reducing gases is not necessarily lowered when such gases are delivered into a cleanup or reaction zone where the gases are intimately contacted with molten heavy metal since this molten reagent metal is kept at an elevated temparature. As reagent metals, various heavy molten metals may be used which are in their liquid state at elevated temperatures, and which in the gas systems of interest, preferentially form metal sulfides rather than metal oxides. The reaction in the cleanup zone whereby sulfur removal is attained may be indicated as follows:

$$M + X_2S = MS + X_2$$

The symbol M represents a reagent metal of the type defined, the symbol X represents hydrogen, a methyl group, or the like, while MS represents the metal sulfide. Thus in one particular preferred form of the invention, hydrogen sulfide is reacted in the cleanup or reaction zone with molten lead in accordance with $$Pb + H_2S = PbS + H_2$$

Following the above reaction in the cleanup zone or chamber, the still hot gases are moved out of the cleanup zone with the hydrogen sulfide therein substantially removed. The equilibrium constant for the reaction with lead and hydrogen sulfide is favorable up to about 1100°C, even higher. Therefore, only small traces of hydrogen sulfide remain in the off-gas discharged from the cleanup zone if good contact is provided between the gas and the molten metal. Desired large areas of contact are favorably provided between the gas and the reagent molten metal by various means. In the preferred form, a shower of droplets is thrown through the flowing gases passing through the reaction chamber by means such as rotatng discs or paddle wheel partialy immersed in a metal pool in the bottom of the chamber. Alternatively, such as droplet shower can be generated by a submerged gas jet. To improve performance, the hot gases may be scrubbed in two or more reaction chambers of this type, operating in countercurrent or cocurrent series. Another embodiment may involve use of a packed tower through which molten lead flow downwardly, countercurrent to upwardly moving gases. Other means will occur to practitioners.

Providing the $H_2O/H_2$ and $CO_2/CO$ ratios are of proper magnitude, as stated herein, undesired oxides will not form. The reagent metal present retains its ability to react with sulfur. It is in this sense that the molten reagent metal is characterized by preferentially forming a metal sulfide rather than a metal oxide. Among metals which have such characteristics are lead, nickel, silver, copper, tin and iron. Alloys which are mixtures of these metals with one another, or with other metals, can be utilized for particular embodiments in accordance with the designs conditions and controls which the practitioner may prescribe.

It is desirable to have the reagent metal in liquid form in the cleanup zone not only because of the relative ease of movement between the cleanup and regenerating zones by pumping but essentially because of reactivity. Solid metal particles would be incapable of extensive reaction due to formation of a thin external coating or skin of the sulfide, causing the reaction to cease, and leaving the metal in the interior of the particles untouched. With liquid droplets, on the other hand, a new liquid metal surface forms every time a drop falls back into the reservoir pool and the liquid is again thrown up as a new drop into the gas phase. Thus, as much of any reagent metal can be made to react as desired.

It should be noted that the sulfide formed will dissolve in the liquid reagent metal until saturation is attained, and such a molten metal saturated with its sulfide is called herein a "melt". Additional sulfide formed in, or added to, such a saturated melt will exist as a separate solid or molten sulfide phase, either suspended in the metal melt or at the boundry layers of the melt. In the preferred method of operation, such solid solids formed as relatively small flakes or particles rather than as large chunks. Such small particles are then present as a slurry. Such a slurry will form, for example, when throwing a shower of melt droplets through the sulfur containing gas. It will be further noted that the metal in these melts, even when carrying solid lead sulfide particles, still shows almost as great a reactivity with hydrogen sulfide as the pure metals themselves, therefore, the presence of solid particles of lead sulfide and dissolved lead sulfide in the lead melt is not a serious detriment as long as fresh liquid metal melt surface can be brought into contact with the gas. Moreover, if enough melt is present, such slurry of solid lead sulfide can be pumped almost as readily as the molten metal itself.

The cleanup or reaction zone may be more accurately identified as containing such a melt or melt slurry. The particular temperature-composition graph of a particular heavy metal and metal sulfide, and method of operation, will establish whether the metal sulfide is present in solid form as well as in solution. Such a graph will balance factors of temperature and sulfur concentration to determine whether a metal sulfide at a particular temperature and concentration will be present in a solid phase as well as dissolved in the molten metal. At any given time, the melt in the reaction zone contains some dissolved metal sulfide, and possibly solid lead sulfide particles. Such melt or melt slurry is continuously removed from the reaction zone while regenerated molten metal, often containing lead sulfide but in lesser amounts, is introduced into such zone. In an important aspect of the invention, melt containing sufficient metal is continuously returned to the reaction zone not only to react with all the sulfur compounds present in the hot reducing gases introduced into such a reaction zone, but in sufficient excess to form a pumpable system of a melt slurry.

The melt containing the formed metal sulfide, either in solution and/or suspension is withdrawn from the cleanup zone and transferred to a regeneration zone or chamber where at least part of this metal sulfide is decomposed to metal and elemental sulfur or a sulfur-containing compound. This sulfur or sulfur-containing compound is discharged from the regenerating chamber or zone, and the regenerated molten metal becomes part of the melt and is recycled to the cleanup zone for subsequent reaction with new streams of hot reducing gases. The melt containing regenerated metal reagent is then returned in an excess amount of at least about 30 vol% relative to the amount required to react with substantially all of the predetermined sulfur compound in the reducing gas. This minimum excess melt is required to provide a liquid vehicle which will serve to carry the solid lead sulfide particles through the pump, pipe and chamber. The minimum excess of returned melt must therefore allow the solid metal sulfide to be removed as a pumpable slurry. In preferred practice, the metal melt is recycled in excess amounts which are several times that required to react with all the predetermined sulfur, say 200 vol% to 100 vol% excess amount.

The regeneration zone comprises a separate and independent reaction chamber where the regenerated molten metal is collected for recycling and introduction into the cleanup chamber or zone. At least part of the lead sulfide is here converted to the metallic lead form in any number of ways accepted in the art, including roasting to the oxide or sulfate forms, and then reacting the oxidized lead compound with more lead sulfide to obtain metallic lead and sulfur dioxide. Lead oxide also may be reduced to lead with carbon, hydrogen, carbon monoxide. In another alternative practice, regeneration might involve blowing lead metal containing dissolved and suspended lead sulfide with a limited amount of air in a separate apparatus to form elemental lead and sulfur dioxide, in accordance with the teachings of U.S. Pat. No. 3,281,237 issued to the present applicant and F. Schora.

Regeneration of the lead sulfide has also been accomplished electrolytically in a cell using a lead part serving as the cathode, a carbon rod as the anode, and an electrolyte consisting of a solution of lead sulfide in other conducting materials such as the alkali sulfides, chlorides, and the like. The use of those latter mixed electrolytes may be desirable in order to attain a lowered melting point, greater electrical efficiency, and the like. In the operation of such a cell, sulfur forms at the anode and metallic lead forms at the cathode. Depending on temperature, pressure, and the other operating conditions, this sulfur may be produced as a liquid or a gas.

The lead sulfide fed to the cell just described may be in the form of liquid or solid skimmings or it may be in solution or suspension in molten lead. In all cases, this lead sulfide will dissolve to some degree in the electrolyte layer within the cell, distributing itself between this electrolyte and the lead in accordance with the well-known principles of solution of a component soluble in both of two contiguous liquid layers. The presence of dissolved lead sulfide in the lead cathode metal does not significantly impair the action of this metal as a cathode.

The foregoing illustrates a continuous process which can operate by forming lead sulfide in the cleanup zone to substantially remove contaminating sulfur containing compounds from the hot reducing gases, withdrawing the lead sulfide in solution or also partly as a slurry in the lead melt to a regenerating zone which regenerates the lead from at least part of the lead sulfide and returns the resultant metal to the cleanup zone. It is required, according to the teachings of the present invention, to return molten lead in the melt in amounts sufficient not only to react with all the sulfur compound present in the incoming hot reducing gases, but also to form a pumpable slurry with any solid lead sulfide present. In many industrial processes the practitioner knows the content of the sulfur gases in the hot reducing gases, and based on this knowledge, the practitioner can readily ascertain the amount of molten lead which must be returned as a melt to the reaction zone not only to react with all the known sulfur compounds in the particular hot reducing gas. In addition, an excess of melt should be returned to form a pumpable slurry with any solid lead sulfide present in the melt. In the event that there is some question, then the practitioner can determine the amount of sulfur compound formed by withdrawing a sample of the hot reducing gas and analyzing. Precise analysis may not be necessary since the practitioner can then make certain that sufficient molten metal is returned in the melt to react with all the sulfur compound present within a particular minimum-maximum range based on the analysis plus an excess. In other words, a quantity of melt containing an excess of at least 30 vol% of the molten reagent metal is returned based on the predetermined content of the sulfur content in the hot reducing gases. Of course, if all of the lead sulfide formed is to be brought into solution, then a very large excess of molten lead must be returned, at least 300 vol%, as may be seen from following FIG. 2. In still another embodiment, a sensor can be provided to bleed off samples of the hot reducing gases and analyzing for sulfur content, such as by spectroscopic analysis.

Reference may now be made to the accompanying drawings wherein:

FIG. 1 is a highly diagrammatic representation of the continuous process for substantially removing a sulfur compound from hot reducing gases by forming a metal sulfide, regenerating the metal, and recycling the metal; and FIG. 2 is a graphic representation of a temperature-composition diagram for lead and lead sulfide.

A sensor 2 is shown connected to a conduit means 3 for delivering hot reducing gases. Samples withdrawn for analysis may pass through a sensor, which analyzes rapidly, such as a mass spectrophotometer or a gas chromatograph. The sensor means may also be viewed as representing conventional chemical analysis of the hot reducing gases at some point prior to immediate delivery and to a reaction zone or container 4 containing metal or a melt sulfide slurry 5 which is continuously thrown through the gas in the chamber by wheel 16. The sulfur compound contaminants are removed from the gas by reaction in container 4 with these molten melt droplets, and the purified hot off-gases leave this reaction container through duct 7.

Sulfides in general have a lower density than metals from which they are derived and so, if desired, can be skimmed off the molten metal surface. Alternatively, as in FIG. 1, the melt of molten metal and metal sulfide is withdrawn as a slurry of the metal sulfide in the metal, or as a solution of the metal sulfide in the metal. The melt is removed from the reaction container 4 through line 8 by gravity or under urgings of pump 9 and under control of value 10. Line 8 empties into a regenerating zone or chamber 11 where the collected metal sulfide is at least partly electrolyzed to liquid metal and elemental sulfur. The regenerated metal together with any unregenerated lead sulfide in solution or particulate form is then returned through line 13 under urgings of pump 14 and under control of valve 15 into the reaction container 4 in amounts which, at the least, are sufficient not only to react with all the predetermined sulfur compound in the entering hot reducing gases but to make a pumpable slurry. The melt containing the regenerated molten metal is charged into the reaction or cleanup container, and the rotating wheel 16 disperses the melt into the gas phase in the form of droplets from the body or pool of melt in which such wheel is partly immersed. Such a wheel may be made in accordance with a splash condenser disclosed in U.S. Pat. Nos. 1,715,960; 1,091,543; 2,380,548; and 2,457,544. The melt 5 in container 4 may be in part covered by a layer of solid metal sulfide particles. In such event, wheel 16 should dip down through this layer into the melt 5 so that the metal as well as the sulfide is flung into the gas phase.

The regenerating zone 11 is shown as further including a carbon anode element 17 joined by conductor line 18 to a voltage source 19. A similar conductor joins the voltage source to a contact element 20 in the molten metal which operates as the cathode. The anode element 17 is dipped in an electrolyte layer 22 which may be the chloride of the metals used, or an alkali metal salt such potassium chloride, sodium sulfide, and the like, with the metal sulfide soluble therein. Electrolysis regenerates the molten metal for recycling through return line 13, while the volatilized (or liquid) sulfur generated at the anode is removed through discharge port 23, which may also serve as an inlet to charge the chamber with 37 make-up" electrolyte 22. It will be appreciated that apparatus constructed in accordance with the foregoing diagrammatic representation would be provided, though not shown, with refractory linings in the reaction container and the regenerating zone, as well as providing similar heat resistant protection in the ancillary equipment such as conduit lines and the like. Likewise, heating elements and structures would be provided if needed to maintain the metal in the molten state in the cleanup container and regeneration chamber. It is found desirable to withdraw the liquid lead from such a low position, relative to the electrolyte layers 22, that no chlorides present are carried over into the regenerating zone 11.

Depending on operations, the stream flowing through line 8 into chamber 11 may comprise a melt or a melt sulfide slurry, that is containing metal sulfide in solution and in suspension. In all these cases, any melt or melt slurry in the feed from line 8 will settle out in regeneration chamber 11, joining the metal layer 24 which serves as the cathode. The sulfides will merge with and/or dissolve in the electrolyte layer 22. A tap 25 may be provided in line 13 to remove samples of regenerated metal to determine the amount, if present, of any unregenerated lead sulfide.

Lead, which melts at 327°C, is a suitable metal for this operation. Lead sulfide melts at the relatively high temperature of 1135°C, and is miscible with lead only above this temperature. The solubility of lead sulfide in lead at lower temperatures is illustrated by the temperature-composition graph shown in FIG. 2. The shaded area is PbS dissolved in the molten lead, as established by temperature and the amount of sulfur. The weight % of sulfur is from one-half to 15 over a temperature range of 300°C to 1200°C. Lead melts at 327°C as indicated by the lower horizontal line of the graph, and lead sulfide is present as a solid in the two phase region represented by the clear area inside the graph. As stated, at about 1135°C all the lead sulfide is in liquid phase. The sulfur content in the molten lead at any temperature can be controlled by adjusting the amount of molten lead returned or recycled from the regenerating zone into the reaction or cleanup zone. The higher the ratio of the returned lead to the delivered hot reducing gases, the lower the concentration of the sulfur in the molten metal. Below the melting temperatures of PbS, where solubility of lead sulfide in lead is limited, the proportion of lead sulfide carried in suspension by by the recycling lead can be similarly controlled.

Reference to a particular temperature-composition graph for a given molten metal and sulfur will inform the practitioner what temperature should be selected for the reaction zone to provide the metal sulfide as a solid in the melt, or be dissolved in the melt. The less the concentration of sulfur in the melt, the lower the required temperature to maintain all the sulfur in liquid or dissolved form, for example. This information is a highly useful tool in allowing the practitioner to select the operating temperature, whether for a slurry or dissolution of the metal sulfide in the melt. In the best practice of the invention, the practitioner will return sufficient molten metal to the reaction zone to react with all of the predetermined sulfur compound within the incoming hot reducing gases, plus a sufficient excess of molten metal to form a slurry of solid sulfide in the melt which can be pumped and handled. The predetermined level of sulfur compound is ascertained by conventional sensing means 2, and then the amount of molten metal returned to the reaction is accordingly adjusted. The returned metal reagent will place the metal sulfide in solution in the melt, or at least lead to a pumpable slurry for removal to the regeneration zone.

The following example illustrates a representative embodiment of the process of the invention, but it should be understood that such example is not intended to represent an exclusive embodiment.

EXAMPLE

A hot reducing fuel gas is analyzed to report the following composition:

| | |
|---|---|
| Hydrogen Sulfide | 0.3% |
| Carbonyl sulfide | 0.1% |
| Water | 23% |
| Carbon dioxide | 9% |
| Carbon monoxide | 26% |
| Methane | 5% |
| Hydrogen | Balance |

The hot reducing gas has a temperature of about 426°C and this gas is delivered into a cleanup container charged with molten lead which dispersed into droplets continuously thrown through the gas by wheels rotating in a body or pool of the molten lead within the container. Here, 51 lbs. of molten lead is recycled to the cleanup chamber for each 1000 ft.$^3$ of incoming fuel gas, or about 3 times the quantity required to react with all the sulfur in the gas. After a single pass, the sulfide content of the hot off-gas leaving the cleanup container, which also operates at 426°C, is lowered well under 2000 ppm. The formed lead sulfide is withdrawn from reaction chamber 4 as a lead slurry and in large part decomposed to the elements in chamber 11 by electrolysis in a chloride solution whereby lead is collected and sulfur is volatilized to a gas. This lead, free from electrolyte droplets but containing about 0.1% dissolve sulfur, is recycled to the cleanup container.

The advantages of using a molten heavy metal as the agent to remove a sulfur compound from the contaminated hot reducing gases is readily evident. Various modifications will occur to practitioners in the use, method and the apparatus. As one example, tin could be used as a solvent for lead to reduce the vapor pressure of the lead over the molten body of lead. While other heavy metals can be used in the manner described, lead has particular advantages associated with its lower melting point of 327°C. To illustrate such as example, copper also readily reacts with sulfur and hot gases, but copper melts at 1083°C.

The invention is now defined by the terms in the following claims which may be further understood by referring to the language in the preceding specification

What is claimed is:

1. A method of removing a heavy metal sulfide forming sulfur compound from hot reducing gases substantially free of oxygen, including the steps of delivering hot reducing gases contaminated with a sulfur compound from an area of production to a cleanup zone containing lead sulfide in solid phase and molten lead reagent to form a melt present as a slurry, contacting said hot reducing gases with said melt in said cleanup zone, the molten lead in said melt characterized by preferentially forming lead sulfide rather than a lead oxide, moving said hot gases out of the cleanup zone as an off-gas with substantial portions of the sulfur compound removed therefrom.

withdrawing said slurry of molten lead and formed lead sulfide to a regeneration zone, regenerating said newly formed metal sulfide to obtain molten lead reagent and elemental sulfur, returning the regenerated metal reagent to the cleanup zone in an excess amount of at least 30 vol % relative to the amount sufficient to react with substantially all the sulfur compound in the incoming gas and to at least form a pumpable slurry of solid metal suflide and molten metal reagent, and removing said elemental sulfur as a volitilized gas from the regeneration zone.

2. A method as in claim 1 wherein the molten lead is recycled in an excess amount of at least about 200 vol % relative to the amount of metal reagent required to react with substantially all the sulfur compound in the hot reducing gas and to form said pumpable slurry.

3. A method which includes the steps of claim 1 above wherein melt in said reaction zone is dispersed into droplets to provide intimate contact with the sulfur compounds in the hot reducing gases and prevent the formation of a permanent lead sulfide skin in the melt.

* * * * *